United States Patent [19]
Szablikowski et al.

[11] Patent Number: 5,808,052
[45] Date of Patent: Sep. 15, 1998

[54] USE OF CELLULOSE MIXED ETHERS AS ADDITIVES FOR EARTH PRESSURE SHIELDS

[75] Inventors: Klaus Szablikowski, Walsrode; Werner Lange, Visselhövede; Jörn-Bernd Pannek; René Kiesewetter, both of Fallingbostel, all of Germany

[73] Assignee: Wolff Walsrode AG, Walsrode, Germany

[21] Appl. No.: 662,751

[22] Filed: Jun. 10, 1996

[30] Foreign Application Priority Data

Jun. 14, 1995 [DE] Germany ............... 195 21 693.8

[51] Int. Cl.$^6$ ............... C08B 11/193; C08B 11/08; C09K 7/00
[52] U.S. Cl. ............... 536/90; 536/95; 536/96; 536/97; 536/98; 536/92; 536/84; 536/85; 507/103; 507/112; 507/113; 507/114; 507/115; 175/267; 175/57
[58] Field of Search ............... 536/90, 91, 92, 536/84, 85, 95, 96, 97, 98; 166/275; 507/100, 103, 112, 113, 114, 115; 175/267, 57

[56] References Cited

U.S. PATENT DOCUMENTS

| | | | |
|---|---|---|---|
| 4,460,751 | 7/1984 | Hanlon et al. | 536/90 |
| 4,552,215 | 11/1985 | Almond et al. | 536/90 |
| 4,649,999 | 3/1987 | Sandy er al. | 536/90 |
| 5,358,561 | 10/1994 | Kiesewetter et al. | 536/90 |
| 5,385,607 | 1/1995 | Kiesewetter et al. | 536/90 |
| 5,395,930 | 3/1995 | Bartz et al. | 536/90 |
| 5,591,844 | 1/1997 | Bantz et al. | 536/90 |

FOREIGN PATENT DOCUMENTS

| | | |
|---|---|---|
| 0 216 591 A3 | 4/1987 | European Pat. Off. . |
| 0 573 852 A1 | 12/1993 | European Pat. Off. . |

*Primary Examiner*—Louise Leary
*Attorney, Agent, or Firm*—Sprung Kramer Schaefer & Briscoe

[57] ABSTRACT

The present invention relates to water-soluble, particularly ternary, preferably ionic, cellulose mixed ethers, more particularly to anionic water-soluble cellulose mixed ethers, as additives for drilling fluid applications.

9 Claims, No Drawings

USE OF CELLULOSE MIXED ETHERS AS ADDITIVES FOR EARTH PRESSURE SHIELDS

The present invention claims the use of new types of ternary ionic cellulose mixed ethers, the use of which, in shield advance, for shield systems operated with earth pressure results in higher productivity and improved values of carrying capacity for excavated earth material compared with conventional cellulose ethers or mixtures of cellulose ethers and surfactants.

With the improvement of inner city infrastructure (underground railway tunnels, water and gas pipelines, cables for telecommunications and information systems, etc.), a series of processes was developed at the start of the 1960s for the mechanized advance of tunnels in unconsolidated material. These are the so-called advance processes, by means of which excavated rock can be discharged rapidly, safely and cost-effectively. The technical demands on shield systems of this type, which have become increasingly severe over the years, and their adaptation to geological conditions which vary in each case (nature of the soil, etc.), have resulted in the development of completely new methods in this area (T. Krause, Degree Work, Technical University of Brunswick, 1987; DE 24 57 187; JP HEI 1-239293, HEI 5-59886, HEI 1-121396). Of the various shield systems which are currently employed world-wide, those systems which operate with a liquid-supported driving face (so-called suspension shields) or with an earth-supported driving face (so-called earth pressure shields) are becoming increasingly widely used.

Suspensions of water and bentonite or clays, for example, to which cellulose ethers such as carboxymethyl cellulose, for example, and sand or mica are generally added, are used to support the driving face in systems of this type. Under the supporting pressure which predominates locally, suspensions such as these penetrate into the soil and seal the driving face with a filter cake. The soil is then mechanically or hydraulically loosened at the driving face with a mining device, is blended with the clay suspension in a workings chamber, and is subsequently conveyed to the surface of the terrain via pipelines. The soil which is removed is either separated from the clay suspension in a special separating installation or is dumped directly in a waste tip. In addition to its lubricating and sealing functions, etc., the addition of bentonite or clay to the excavated soil performs the function of increasing the sealing capacity of the soil. A particular disadvantage here is that the permeability of the soil removed is reduced by the addition of bentonite and clay, due to which the dewatering which is necessary before it is transported away becomes more expensive. Moreover, the load bearing capacity of the soil mixed with bentonite and clay is sometimes so low that the assignment criteria for final dumping are not fulfilled, due to the poor mechanical strength of the soil to be dumped, which again leads to expensive subsequent treatments or to the costly final dumping of the soil enriched with bentonite or clay in waste tips (special waste tips) which are specially designated for this purpose.

Of the various shield systems, such as hydro shield, thix shield, hydrojet shield and mix shield, for example, a change from what is termed liquid support to earth pressure support can only be made with the mix shield. The loosened soil itself is used as the supporting medium here, which is particularly advantageous for cohesive, paste-like soils. The so-called earth pressure shields (earth pressure balance—EPB shield) which operate based on this principle were originally developed in Japan, but are becoming increasingly important in other countries also, due to their technical and economic advantages. The soil is removed here with a rotating cutter wheel and passes through openings in the cutter wheel into the workings chamber. The soil which is removed is transported to the surface using conveyor belts or conveyor screws or hydraulically in pipelines, for example. Different variants are used depending on the technical requirements of the particular application, e.g. earth pressure-operated shields with the addition of foam or earth pressure shields with suspension back-pressure. In Japan, the addition of polymer foams has proved to be the most effective method. The principle and the advantages of a process such as this compared with conventional shield systems are referred to in JP 900018886 and JP 880061354, for example (see also: the company brochures of Komatsu Ltd., ("The Development of Chemical Plug Shield Tunnelling", Japan 1990; the company brochures of the Obayashi Corp. "Development of Chemical Foam Injection Shield Tunnelling Method", Japan 1992; Y. Hanyuda, T. Fujiwara, Research Inst. Obayashi, page 21 (1988)). Since this process itself is not the subject of the present invention, the special process technology features of this shield system will not be described in more detail at this point.

The composition of foam-generating systems of this type is specified, for example, in GB 226 3940 A. According to this document, these systems consist of surface-active substances, such as for example certain natural proteins, alkyl ether sulphates such as sodium lauryl ether sulphate for example, water-soluble cellulose ethers e.g. conventional cellulose ethers such as methyl, carboxymethyl or ethyl cellulose ethers, as well as water-absorbing resins and phase transfer catalysts such as dodecyl trimethylammonium chloride, alkyl benzyl dimethylammonium chlorides and benzalconium chloride.

Foams with a high carrying capacity for the excavated rock in the workings chamber are produced with the aid of special foam generators. The mixture of soil and foam is transported to the surface by conventional methods and is treated with complex-forming salts or with special enzymes (e.g. proteases, lipases (see JP 90 001 8886)). By this means, the aim in particular is to accelerate the decomposition of the foam-generating components used and to ensure that the soil-foam mixture is finally dumped in an environmentally compatible manner.

Irrespective of the type of subsequent treatment of the soil-foam mixture, at least two components are generally used, namely a foam former (surfactant) and a thickening agent or foam stabilizer (cellulose ether). However, in many cases (see above) the use of more than three media is deemed to be necessary, so as thereby to fulfil all the technical requirements properly.

In principle, the use of several foam-generating or foam-stabilizing systems is disadvantageous on economic and process technology grounds, since treatment with surfactants or proteins, particularly natural products which can readily be decomposed by enzymes, makes extensive safety precautions necessary in order to prevent the contamination of storage tanks by surfactants or proteins which have not yet been used, for example. Finally, the technology for production, supply and storage (pH and temperature control) and for the preparation of mixtures is associated with high costs, which in turn leads to the process technology of the system becoming more expensive. In this respect, good biological degradability per se can still not be equated with good environmental compatibility, since the degradation products themselves may have a higher ecological toxicity than the starting compounds (e.g. alkylphenol oxyethylates). Moreover, water-soluble cleavage products of compounds which are readily biologically degradable result in an increase in the proportion of organically bonded carbon which is dissolved in the groundwater (TOC value or DOC value), and therefore in inadmissible pollution of the environment. The aim of development must therefore be to provide foam systems which possess the positive properties of conventional systems but which can be produced inexpensively and which do not necessitate a high level of technical expenditure in use. In addition, it should be possible to dump the excavated soil-foam mixture without problems, and it should have sufficient mechanical strength (see bentonite/clay for example) to satisfy the assignment criteria for final dumping in a waste tip.

Surprisingly, it has now been found that the use of ternary ionic cellulose mixed ethers as additives for foam-generating systems in the shield advance technique for earth pressure shields results in an equivalent or higher productivity, with improved values of the carrying capacity for the soil material at the same time.

Within the scope of the present invention, ternary ionic cellulose mixed ethers are preferably used on their own or as a mixture with conventional polysaccharides, hydrocolloids or surface-active, foam-generating components (surfactants) as additives in the shield advance technique for earth pressure-operated shield systems.

In this connection, the term "polysaccharide" is understood to mean unrefined, i.e. chemically unaltered, native biopolymers which are left in their original state and concentrated by physical methods. The term "hydrocolloids" denotes refined, i.e. chemically modified, biopolymers. The term "surface-active, foam-generating components (surfactants)" is understood to mean anionic, cationic, non-ionic and ampholytic types of surfactants.

When the ternary ionic water-soluble cellulose mixed ethers claimed according to the invention are not used on their own, but are used in a mixture of the aforementioned components, the amount of cellulose mixed ethers claimed according to the invention in the total mixture is 0.001–99.999% by weight, particularly 0.1–90% by weight, preferably 1–50% by weight.

When the aforementioned mixtures are used, the term "hydrocolloids" is understood within the context of the present invention to mean chemically modified, refined, water-soluble biopolymers. Preferred hydrocolloids are polysaccharide ethers, such as cellulose ethers, carboxyalkyl cellulose ethers (e.g. carboxymethyl cellulose), hydroxyalkyl cellulose ethers (e.g. hydroxyethyl cellulose, hydroxypropyl cellulose), carboxyalkyl hydroxyalkyl cellulose ethers (e.g. carboxymethylhydroxyethyl cellulose, carboxymethylhydroxypropyl cellulose), sulphoalkyl cellulose ethers (e.g. sulphoethyl cellulose, sulphopropyl cellulose, methylsulphoethyl cellulose, methylsulphopropyl cellulose, carboxymethylsulphoethyl cellulose, carboxymethylsulphopropyl cellulose), alkyl cellulose ethers (e.g. methyl cellulose, ethyl cellulose), alkylhydroxyalkyl cellulose ethers (methylhydroxyethyl cellulose, methylhydroxypropyl cellulose, ethylhydroxyethyl cellulose, ethylhydroxypropyl cellulose), alkylene cellulose ethers (e.g. allyl cellulose ether), alkylene-alkyl cellulose ethers (e.g. allylmethyl cellulose ether, allylethyl cellulose ether), dialkylaminoalkyl cellulose ethers (e.g. diethylaminoethyl cellulose ether), or dialkylaminoalkylhydroxyalkyl cellulose ethers (e.g. diethylamino-ethylhydroxyethyl cellulose ether), modified starches, such as oxidised, alkylated, hydroxyalkylated and carboxyalkylated starches, for example, and modified guar products, such as for example carboxymethyl guar.

The term "polysaccharide" is preferably understood to mean celluloses, xanthan, starches, gum tragacanth, tamarinds, alginates, gum arabic, proteins, pectins, galactomannans (e.g. guar flour and carob seed grain) and carrageenans.

Surface-active, foam-generating components (surfactants) are anionic surfactants (e.g. alkylbenzene sulphonates, alkane sulphonates, fatty alcohol sulphates or fatty alcohol ether sulphates), cationic surfactants (e.g. alkylammonium compounds, imidazolinium compounds), non-ionic surfactants (e.g. fatty alcohol ethoxylates, alkynenol ethoxylates, fatty aminoethoxylates, sugar surfactants, fatty acid ethoxylates, fatty acid ester ethoxylates) and amphoteric surfactants.

The content of hydrocolloid, polysaccharide and surface-active component in the total mixture claimed according to the invention is 99.999–0.001%, particularly 99.9–10%, but preferably 99–50% by weight.

When mixtures are used, the type and proportion of the hydrocolloids, polysaccharides and surface-active components used which are not claimed according to the invention depends on economic, environmental and geological requirements and necessities, and on those determined by the technology of the application. The sum of the mixture consisting of hydrocolloid, polysaccharide and surface-active component, as well as the amount of the individual components in the total mixture, is not the subject of the present invention, and can therefore be varied according to choice without the essence of the invention thereby being changed.

The use of the aforementioned mixtures makes it necessary to mix all the components homogeneously, intensively and thoroughly. The method of thorough physical mixing which is employed, and the type of mixing installation, are unimportant to the essence of the present invention, and are thus also not a subject of the invention.

According to an advantageous embodiment of the invention, the ternary ionic cellulose mixed ethers claimed according to the invention have an average degree of substitution by alkyl substituents, particularly methyl or ethyl substituents, of DS=0.5–2.8, particularly DS=0.8–2.5. The preferred average degree of substitution of the ionic components, particularly of the carboxyalkyl, dicarboxyalkyl or sulphoalkyl substituents, preferably the carboxymethyl, dicarboxymethyl or sulphoethyl substituents, is given by DS=0.0001 to 1.5, particularly DS=0.001 to 1.3. The average molar degree of substitution by hydroxyalkyl substituents, particularly hydroxyethyl or hydroxypropyl substituents, is given by MS=0.001 to 2.5, particularly MS=0.01 to 2.5.

The invention is described in more detail below, with reference to preferred examples of embodiments, by comparison with cellulose ethers or mixtures of cellulose ethers with foam-generating systems (surfactants) which characterize the prior art.

The cellulose ethers or physical mixtures of cellulose ethers which have been used are characterised by the property data given in Table 1.

Preparation of the ionic ternary cellulose mixed ethers claimed according to the invention:

1. Methyl-hydroxyethyl-sulphoethyl cellulose (MHESEC) (see Table 1, product no. 10)

7.5 kg of a commercially available methylhydroxyethyl cellulose (Walocel MW 1500 GA; Wolff Walsrode AG, Walsrode) with a solids content of 93.4% were pre-swollen for 16 hours in 36 litres of isopropanol in a suitable pressurised reactor with a paddle stirrer (L ödige mixer). After evacuating and flushing with nitrogen three times, 1.18 kg sodium hydroxide flakes and 16.05 kg of a 30% aqueous solution of sodium vinyl-sulphonate were introduced. After alkali treatment for 30 minutes at 20° C. the mixture was heated to 75° C.

over 40 minutes and was etherified for 3 hours at this temperature. The mixture was neutralised at 75° C. with a mixture consisting of 1.78 kg acetic acid (100%) and 0.36 kg hydrochloric acid (30%). The reaction mixture was then cooled and the product was separated from the suspension medium, washed free from salt with aqueous methanol, dried and ground. The characteristic property data of the product are given in Table 1.

2. Methyl-hydroxyethyl-carboxymethyl cellulose (MHECMC) (see Table 1, product no. 6)

209.5 parts (solids content: 94.2%) of a commercially available 5 methylhydroxyethyl cellulose (Walocel MKX 30000 PF 01, Wolff Walsrode AG, Walsrode) were dispersed in 1177 parts isopropanol in a nitrogen atmosphere in a thermostatically controllable reactor with a suitable stirrer and stirred for 15 minutes. Thereafter, 4 ml of a 30% sodium hydroxide solution were added drop-wise over 5 minutes and the mixture was treated with the alkali for 1 hour at 25°–30° C. 1.77 ml of a 79% by weight aqueous solution of monochloroacetic acid were added. The mixture was heated to 70° C. over 30 minutes and was etherified at this temperature for 2 hours. The product was separated from the slurry, washed with 100% isopropanol, dried at room temperature and then ground. The characteristic property data are given in Table 1.

3. Methyl-hydroxyethyl-dicarboxymethyl cellulose (MHEDCMC) (see Table 1, product no. 7)

104.7 parts (solids content: 94.2%) of a commercially available methylhydroxyethyl cellulose (Walocel MKX 30000 PF 01, Wolff Walsrode AG, Walsrode) were dispersed in 948 parts isopropanol and 49.9 parts water in a nitrogen atmosphere in a thermostatically controllable reactor with a suitable stirrer and stirred for 15 minutes. Thereafter, 4 parts of sodium hydroxide flakes were added and the mixture was treated with the alkali for 60 minutes at 25°–30° C. The mixture was heated to 80° C. over 30 minutes and 8.77 parts dimethyl chloromalonate (95%) were added at this temperature. The mixture was etherified at 80° C. for 4 hours. The product was then separated from the slurry, washed with methanol, dried at room temperature and then ground. The characteristic property data are given in Table 1.

4. Methyl-hydroxypropyl-carboxymethyl cellulose (MHPCMC) (see Table 1, product no. 9)

106.75 parts (solids content: 97.05%) of a commercially available methylhydroxypropyl cellulose (Walocel MKS 20000 PP 11, Wolff Walsrode AG, Walsrode) were dispersed in 1608 parts isopropanol and 166 parts water in a nitrogen atmosphere in a thermostatically controllable reactor with a suitable stirrer and stirred for 15 minutes. Thereafter, 38.4 parts of sodium hydroxide flakes were added and the mixture was treated with the alkali for 45 minutes at 25°–30° C. 57.5 parts of a 78% by weight aqueous solution of monochloroacetic acid were added. The reaction mixture was heated to 75° C. over 30 minutes and stirred for 2.5 hours at this temperature. The product was separated from the slurry, washed with 50% aqueous acetone, dried at room temperature and then ground. The characteristic property data are given in Table 1.

TABLE 1

Characteristic property data of cellulose ethers and cellulose ether mixtures

| Product no. | Cellulose ether | DS-Me[1] | DS-SE; DS-CM[2] | MS-HE MS-HP[3] | Solids content [%] | Viscosity [mPa · s][4] | Remarks |
|---|---|---|---|---|---|---|---|
| 1 | CMC[5] | — | 0.88 | — | 90,6 | 200 | prior art |
| 2 | MHEC[6] | 1.60 | — | 0.28 | 96.7 | 53 | prior art |
| 3 | MHEC:CMC (15:85)[7] | [7] | [7] | [7] | 91.5 | 234 | [7] |
| 4 | MHEC:CMC (50:50)[8] | [8] | [8] | [8] | 93.5 | 217 | [8] |
| 5 | MHEC:CMC (85:15)[9] | [9] | [9] | [9] | 95.7 | 127 | [9] |
| 6 | MHECMC[10] | 1.49 | 0.07 | 0.26 | 93.2 | 228 | invention |
| 7 | MHEDCMC[11] | 1.49 | 0.05[12] | 0.26 | 93.4 | 234 | invention |
| 8 | MHECMC[10] | 1.49 | 0.19 | 0.26 | 91.9 | 173 | invention |
| 9 | MHPCMC[13] | 1.56 | 0.51 | 0.19 | 94.5 | 154 | invention |
| 10 | MHESEC[14] | 1.29 | 0.82 | 0.18 | 89.7 | 5 | invention |

[1] average degree of substitution by methyl groups (Me)
[2] average degree of substitution by sulphoethyl groups (SE) or carboxymethyl groups (CM)
[3] mean degree of substitution by hydroxyethyl groups (HE) of hydroxypropyl groups (HP)
[4] viscosity measured as a 0.5% by weight aqueous solution in a rotating viscometer (Haake) at D = 2.5 sec$^{-1}$, T = 20° C.
[5] carboxymethyl cellulose; Walocel CRT 10000 PA ® (Wolff Walsrode AG)
[6] methylhydroxyethyl cellulose ether; Walocel MKX 8000 PP 11 ® (Wolff Walsrode AG)
[7] physical mixture of 15% by weight methylhydroxyethyl cellulose and 85% by weight carboxymethyl cellulose (see footnotes[5] and [6])
[8] physical mixture of 50% by weight methylhydroxyethyl cellulose and 50% by weight carboxymethyl cellulose (see footnotes[5] and [6])
[9] physical mixture of 85% by weight methylhydroxyethyl cellulose and 15% by weight carboxymethyl cellulose (see footnotes[5] and [6])
[10] methyl-hydroxyethyl-carboxymethyl cellulose; prepared analogously to product no. 6
[11] methyl-hydroxyethyl-dicarboxymethyl cellulose
[12] degree of substitution by dicarboxymethyl groups
[13] methyl-hydroxypropyl-carboxymethyl cellulose
[14] methyl-hydroxyethyl-sulphoethyl cellulose The advantage of using the systems claimed according to the invention is described below, with reference to the methods of measurement which are described in detail below by way of example. The preparation of the ternary ionic cellulose mixed ethers which are claimed according to the invention as additives for earth pressure shields may be carried out, for example, by known synthesis procedures described in the literature (see U.S. Pat. No. 5,385,607 which is equivalent to EP 0554749 A2, U.S. Pat. No. 5,358,561, which is equivalent to DE 4203530 A1, U.S. Pat. No. 5,395,930, which is equivalent to EP 0573852 A1, for example). As additives in shield advance for shield systems operated with earth pressure, the products prepared in this manner, on their own or as a mixture with conventional additives (hydrocolloids, polysaccharides, surface-active components (surfactants)) surprisingly exhibit higher productivities and improved values of carrying capacity for the excavated material compared with the products which characterise the prior art (methyl cellulose ethers, carboxymethyl cellulose ethers, ethyl cellulose ethers).

The products are preferably inexpensively prepared by the so-called one-pot process without intermediate isolation or purification, the sequence of addition of the etherification reagents used being of no significance to the essence of the invention. It is thus possible first of all to react the ionic components with the alkali cellulose and subsequently to etherify the latter with alkylating and hydroxyalkylating compounds. It is also possible to place the alkylating compound in the reactor, on its own or in admixture with compounds which transfer hydroxyalkyl groups or with compounds which transfer carboxyalkyl or sulphoalkyl groups, and to conduct the etherification reaction subsequently—by degrees according to the respective reactivities of the reactants—under controlled physical conditions (pressure, temperature). Furthermore, commercially available cellulose ethers (carboxymethyl cellulose ether, methyl cellulose ether, methylhydroxyethyl cellulose ether, methylhydroxypropyl cellulose ether, ethyl cellulose ether, ethylhydroxyethyl cellulose ether, ethylhydroxypropyl cellulose ether) may be placed in the reactor and can subsequently be modified with reagents which transfer alkyl groups, hydroxyalkyl groups and/or carboxyalkyl groups and/or sulphoalkyl groups.

Organic or aqueous-organic systems which are customary in the prior art and which are described in the literature are used as suspension media; these are not themselves a subject of the present invention (see EP 0 080 678, EP 0 161 607 B1, EP 0 126 959 in this respect, for example).

The work-up and manufacture of the ternary ionic cellulose ethers which are used according to the invention for earth pressure shields in tunnel construction are effected in the customary and known manner according to the prior art. After the etherification process, the products are neutralised if necessary and separated from the slurry medium which is present, and are freed from by-products and if necessary from amounts of alkali or adhering salts which are still present. If the products have thermal flocculation points, purification with hot water is advantageous. When the etherification is a two- or three-step process, purification may be effected after the first step or after the second step also. When stoichiometric amounts of alkali-consuming reagents are used, such as methyl chloride or ethyl chloride for example, neutralisation may be omitted.

Due to the catalytic amounts of alkali which are optionally present in the second or in the third step, it is also possible to remove the excess alkali by suitable inert washing media (e.g. aqueous-alcoholic solvent mixtures) and thus to avoid the neutralisation step or, if neutralisation is employed, to leave the small amounts of salts in the products and to dispense with a purification step.

The ternary ionic cellulose mixed ethers claimed according to the invention were tested by means of the following laboratory investigations for their suitability as additives for earth pressure-operated shield systems for tunnel construction compared with conventional cellulose ethers and mixtures of cellulose ethers with surfactants. In this respect, the properties which a suitable additive must possess are determined by the very different demands which are imposed on the soil-additive mixture (e.g. sealing against water under pressure, reduction of the shear resistance for the cutter and mixer wheels, formation of a homogeneous mixture of good consistency, suitability for belt transport, capability of being dumped, etc.). The quantitative data given in the examples are not absolute values but depending on the locally existing subsoil and geological conditions, differ from the actual amounts which are used in practice.

The following investigations were performed:
1. Investigation of the foaming factor
2. Determination of the consistency of the soil-foam mixture by means of a settlement determination (slump test according to DIN ISO 4109)
3. Foam stability and determination of the flow limit by means of a suspended ball array (DIN ISO 4126)
4. Determination of the density during the slump test and of the solids content of the foam-soil mixture.

The foam factor, which constitutes the ratio of the volume of the foam to the volume of the liquid solution, was determined in addition to a visual assessment in order to represent the foam quality. 1.5% by weight cellulose ether solutions were prepared for the determination of the foam factor, taking their solids contents into consideration. Some of the tests were performed with the addition of a commercially available surfactant (2% by weight surfactant of type OMC 181®, Henkel KGaA, Düsseldorf). In general, the procedure was such that 357 g or 350 g solution - with or without surfactant—was foamed with a mixer (Type MUM 44, supplied by Bosch; stirring speed stage 4) for 3 minutes in a vessel with a capacity of 3.5 litres (diameter 20 cm, depth 13 cm). The foam factor was determined by measuring the foam volume and calculating the ratio of the foam volume to the volume of liquid. High values in this test denote high productivities.

A test specification for underground curtain walls made of site-mixed concrete according to DIN ISO 4126 was employed for the determination of the foam stability or the foam carrying capacity.

A suspended ball array unit was used to determine the flow limit of the foam produced by the aforementioned method. In this test, the flow limit characterises the initial shearing stress which has to be overcome in order to set the soil-foam mixture in motion. The principle of measurement is based on the simultaneous immersion of a plurality of glass and steel balls of different diameters and weights in the supporting liquid or the foam. At a given density of the liquid or of the foam, a different critical flow limit is associated with each ball (see Table 2), at which it remains in suspension in the liquid or in the foam. Balls for which the critical flow limits are lower than the flow limit of the liquid or of the foam float on the supporting liquid or on the supporting foam. Those for which the critical flow limit is higher become submerged. The balls are characterised by serial numbers in increasing order of their critical flow limits. The flow limit of the supporting liquid/foam is therefore between the critical flow limit of the ball with the highest number which still floats and the critical flow limit of the ball with the lowest number which is submerged in the supporting liquid.

For the measurement, the disc on which the balls are suspended by means of perlon threads is suspended in a device which enables it to be moved slowly in a vertical direction. It is thus ensured that the balls are placed gently on the surface of the foam or are immersed below the latter.

In the tests performed here, the period between the production of the foam and the placement of the suspended ball array on the foam surface was a constant 70 seconds. The balls suspended on the disc are submerged in the foam or remain floating on the latter. The threads of the balls which are submerged in the foam are stretched taut; the threads of those balls which are not submerged are curved. The individual balls on the disc are characterised by serial numbers. The highest number of the submerged balls (stretched thread) is noted. The reading is taken 20 seconds after placing the suspended ball array on the foam surface.

A sample soil with a given grain size distribution and defined proportions of fine, medium and coarse fractions was used for the investigation of the mixture of foam and the soil material to be discharged. The grain size distribution curve of the soil plotted against percentage by weight of the total amount followed an S-shaped curve with an almost straight central line connecting the bent ends, the curve extending from 0.13 to 3.5 mm in diameter.

the mould and the highest point of the specimen to an accuracy of 5 mm. If the slump (spreading dimension) is less than 50 mm, the soil-foam mixture is too stiff to be processed. On the other hand, values greater than 300 mm are also undesirable, since due to its strongly liquefying action the product no longer possesses stabilising and sealing properties (risk of so-called "surface break-out"), and it cannot therefore be used without reservations, nor can it be discharged by means of conveyor belts without problems. For the field of application described here, slump value of 180±50 mm are aimed at in order to obtain a workable mixture which can be transported away and dumped without further treatment steps (drying or separation, etc.).

The density of the soil-foam mixture was determined, about 5 minutes after preparing the mixture, by measuring the volume of and weighing the material which remained after filling the truncated cone. In order to assess the efficacy of the sample, the foam addition in the first step was designed to be insufficient, at 10% by volume. In a further

TABLE 2

Determination of the flow limits $t_F$ in N/mm$^2$ with the suspended ball array device

| no. | Ball material | Ball diameter [mm] | Weight [g] | for a density in g/cm$^3$ | | | | | | |
|---|---|---|---|---|---|---|---|---|---|---|
| | | | | 1.02 | 1.07 | 1.12 | 1.17 | 1.22 | 1.27 | 1.32 |
| 1 | glass | 2.9 | 0.033 | 6.9 | 6.7 | 6.5 | 6.2 | 6.0 | 5.8 | 5.7 |
| 2 | glass | 4.2 | 0.105 | 10.0 | 9.7 | 9.4 | 9.0 | 8.7 | 8.4 | 8.1 |
| 3 | glass | 5.8 | 0.26 | 13.8 | 13.4 | 12.9 | 12.5 | 12.1 | 11.6 | 11.2 |
| 4 | glass | 7.6 | 0.60 | 18.1 | 17.5 | 16.9 | 16.4 | 15.8 | 15.2 | 14.7 |
| 5 | glass | 10.6 | 1.59 | 25.2 | 24.4 | 23.6 | 22.8 | 22.0 | 21.3 | 20.5 |
| 6 | glass | 15.1 | 4.70 | 35.9 | 34.8 | 33.6 | 32.5 | 31.4 | 30.3 | 29.2 |
| 7 | steel | 4.0 | 0.26 | 39.8 | 39.5 | 39.2 | 38.9 | 38.6 | 38.3 | 38.0 |
| 8 | steel | 5.0 | 0.51 | 49.8 | 49.5 | 49.1 | 48.7 | 48.4 | 48.0 | 47.6 |
| 9 | steel | 6.0 | 0.87 | 59.7 | 59.3 | 58.8 | 58.4 | 57.9 | 57.5 | 57.0 |
| 10 | steel | 7.0 | 1.39 | 70.0 | 69.3 | 68.9 | 68.4 | 67.9 | 67.4 | 66.9 |

The so-called slump values according to DIN ISO 4109 for fresh concrete were determined in order to determine the consistency of the soil-additive mixture in the working space and at the end of the conveyor screw. The sample soil was mixed with a constant amount of foam for the tests and the slump was measured by means of the slump test. The water-saturated soil (volume: 6676 ml, density: 2.1 kg/litre) was mixed with 10% by volume of foam for 2 minutes and was subsequently weighed. A hollow truncated cone of defined dimensions was then filled with the mixture of soil and foam. The mould was placed on a firm, flat, moist, water-repellent surface. After removing the truncated cone the slump was determined directly according to DIN ISO 4109, by determining the difference between the height of step the amounts added were increased for different samples until a useable mixture was found which was comparable with the remainder of the consistency values (slump test). The actual amount of foam which is required to be added depends on the type of soil concerned, the groundwater pressure, the type of construction of the shield, etc., and can thus differ appreciably in practice from the amounts used here.

The results of the application technology investigations are listed in the following Table (Table no. 3). Untreated soil was compared with a given surfactant on its own or as a mixture with commercially available cellulose ethers or with a physical mixture of different commercially available cellulose ethers, and with the ternary ionic cellulose mixed ethers claimed according to the invention.

TABLE 3

Results of application technology tests

| Serial no. | Product no. | Cellulose ether | Solids content [%][5] | Surfactant | Foam factor | Foam addition [g][1] | Ball array [no.][6] | | Slump [mm] | Remarks | Density [g/cm$^3$][7] |
|---|---|---|---|---|---|---|---|---|---|---|---|
| | | | | | | | on foam | in foam | | | |
| 1 | — | — | — | — | — | — | — | — | — | soil control sample | — |
| 2 | — | — | — | [2] | 7.6 | 88.3 | 2 | 3 | 165 | soil + surfactant | 1.65 |
| 3 | 1 | CMC | 90.6 | — | 1[3] | 333.8 | 1 | 2 | 10 | prior art | 1.80 |
| 4 | 1 | CMC | 90.6 | [2] | 5.6 | 119.2 | 5 | 6 | 210 | prior art | 1.61 |
| 5 | 2 | MHEC | 96.7 | — | 3.7 | 180.6 | 3 | 4 | 15 | prior art | 1.82 |
| 6 | 2 | MHEC | 96.7 | [2] | 6.3 | 106 | 4 | 5 | 210 | prior art | 1.63 |

TABLE 3-continued

Results of application technology tests

| Serial no. | Product no. | Cellulose ether | Solids content [%][5] | Surfactant | Foam factor | Foam addition [g][1] | Ball array [no.][6] on foam | Ball array [no.][6] in foam | Slump [mm] | Remarks | Density [g/cm³][7] |
|---|---|---|---|---|---|---|---|---|---|---|---|
| 7 | 3 | MHEC:CMC (15:85) | 91.5 | — | 2.7 | 247 | 3 | 4 | 10 | — | 1.83 |
| 8 | 3 | MHEC:CMC (15:85) | 91.5 | 2) | 4.9 | 136.3 | 5 | 6 | 210 | — | 1.64 |
| 9 | 4 | MHEC:CMC (59:50) | 93.5 | — | 3.3 | 203.3 | 5 | 6 | 10 | — | 1.82 |
| 10 | 4 | MHEC:CMC (59:50) | 93.5 | 2) | 5.7 | 116.4 | 4 | 5 | 220 | — | 1.63 |
| 11 | 5 | MHEC:CMC (85:15) | 95.7 | — | 3.1 | 212.4 | 3 | 4 | 10 | — | 1.85 |
| 12 | 6 | MHECMC | 93.2 | — | 4.4 | 150.7 | 9 | 10 | 10 | invention | 1.83 |
| 13 | 6 | MHECMC | 93.2 | — | 4.0 | 250.4 | 9 | 10 | 150 | invention | 1.74 |
| 14 | 6 | MHECMC | 93.2 | — | 4.5 | 259.6 | 9 | 10 | 145 | invention | 1.70 |
| 15 | 7 | MHEDCMC | 93.7 | — | 4.3 | 155.8 | — | >10 | 10 | invention | 1.85 |
| 16 | 7 | MHEDCMC | 93.7 | — | 4.1 | 242.8 | — | >10 | 40 | invention | 1.75 |
| 17 | 7 | MHEDCMC | 93.7 | — | 4.3 | 312 | — | >10 | 160 | invention | 1.68 |
| 18 | 8 | MHECMC | 91.9 | — | 4.3 | 150.7 | 9 | 10 | 150 | invention | 1.66 |
| 19 | 8 | MHECMC | 91.9 | 2) | 5.3 | 125.5 | 5 | 6 | 220 | invention | 1.61 |
| 20 | 9 | MHPCMC | 94.5 | — | 3.9 | 173.1 | 5 | 6 | 185 | invention | 1.70 |
| 21 | 10 | MHESEC | 89.7 | — | 7.0 | 95.4 | — | 5 | 6 | invention | 1.79 |
| 22 | 10 | MHESEC | 89.7 | — | 6.5 | 143.1 | 5 | 6 | 145 | invention | 1.66 |
| 23 | 10 | MHESEC | 89.7 | — | 6.7 | 174.4 | 5 | 6 | 170 | invention | 1.65 |
| 24 | 10 | MHESEC | 89.7 | 2) | 8.0 | 83.6 | 4 | 5 | 190 | invention | 1.64 |

[1] Foam addition: determined via the foam factor; addition of 10% by volume of foam overall (10% ≡ 667.6 ml), with the exception of serial no. 3 (5% by volume), serial no. 13 (15% by volume), serial no. 14 (17.5% by volume), serial no. 16 (15% by volume), serial no. 17 (20% by volume), serial no. 22 (15% by volume), serial no. 23 (17.5% by volume), serial no. 24 (15% by volume)
[2] surfactant: OMC 181 ® (supplied by Henkel KGaA); addition of 2% by weight surfactant
[3] cellulose ether did not foam; added amount of 333.8 g corresponded to 5% by volume
[4] 1.5% by weight, aqueous solution; see Table 1 for property data
[5] solids content of cellulose ether
[6] investigation of the foam by means of suspended ball array; high numbers correspond to high weights (≡high carrying capacity of the foam)
[7] density of soil-foam mixture The aim of the application technology investigations was to obtain simple systems which had high foam factors (productivities) and high values for the carrying capacity for the excavated rock (slump).

For economic and environmental reasons, the addition of foam-generating systems (surfactants) should preferably be avoided. The object was to obtain systems with high productivities (foam factors), sufficiently high spreading dimensions of 180±50 mm, with optimum carrying capacities for the excavated soil material at the same time, characterised by slump values>6 (suspended ball array, prior art (see Table 3)).

The results of the investigations show that foams with a good thickening capacity and thus with a satisfactory carrying capacity for excavated soil material can be obtained according to the prior art with methylhydroxyethyl cellulose ethers without the addition of surfactants (Table 3, serial no. 5, product no. 2). A disadvantage here, however, is the low value of about 15 mm for the slump. A significant change in soil consistency could therefore not be achieved by the addition of MHEC alone. In this form the material is unsuitable for use in an earth pressure shield, since the soil-foam mixture is too stiff for working using the shield advance technique. In practice, the use of a material of this type can result in the entry of groundwater, since the shield can no longer withstand the water pressure. The soil-foam mixture does not exhibit improved behaviour until surfactant is added, and only then is it suitable for use in earth pressure shields with foam-generating systems (Table 3, serial no. 6). However, the liquefying effect, which significantly changes the consistency even at very low amounts of added foam, is a disadvantage here, particularly at higher soil and groundwater pressures, since a sealing effect against water under pressure can only be achieved with a higher amount of added foam, but the pressure in the conveyor screw can then no longer be maintained.

A commercially available carboxymethyl cellulose behaves similarly. The foaming effect of this ionic cellulose ether is practically negligible, so that here also only the combined use of a thickening agent and a surfactant guarantees foams which are sufficiently stable, with a correspondingly good carrying capacity for excavated rock (see Table 3, serial nos. 3 and 4, product no. 1).

On the other hand, if the use of the thickening agent (cellulose ether) is avoided completely and the surfactant is simply used on its own, high foam productivities and good slump values can in fact be obtained. However, foams of this type have no carrying capacity for excavated material, and therefore also cannot be used on their own (Table 3, serial no. 2).

Physical mixtures of commercially available methylhydroxyethyl cellulose and carboxymethyl cellulose also result in no significant improvement compared with the prior art. As regards the application technology tests, prior art properties are substantially achieved with mixtures of 85 parts of methylhydroxyethyl cellulose and 15 parts of carboxymethyl cellulose, but without significant advantages for the user being obtained thereby (Table 3, serial no. 11, product no. 5).

Surprisingly, it has now been found that the use of ternary ionic water-soluble cellulose mixed ethers, particularly methyl-hydroxy-ethyl-carboxymethyl cellulose (MHECMC), methyl-hydroxyethyl-dicarboxymethyl cellulose (MHEDCMC), methyl-hydroxyethyl-sulphoethyl cellulose (MHESEC) and methyl-hydroxypropyl-carboxymethyl cellulose (MHPCMC), results in equivalent or improved properties compared with the prior art, with values for the carrying capacity (slump) which in part are significantly improved.

Foams with a significantly higher carrying capacity compared with the prior art can be obtained with a methyl-hydroxyethyl-carboxymethyl cellulose (MHECMC) (product no. 6 in Table 3), either by increasing the amount of cellulose ether (Table 3, serial no. 14) or by adding surfactant (Table 3, serial no. 19). When the degree of substitution is altered, products from the same class of substance are suitable as additives for the shield advance technique with foam-generating or foam-stabilising systems, even with small amounts of added cellulose ether (10% by volume) and without surfactant additions, and thereby lead to a significant simplification of the process (Table 3, serial no. 18).

Moreover, with methyl-hydroxyethyl-dicarboxymethyl celluloses, foams can be produced which are above the limit of measurement of the test method used here for determining the flow limit (foam consistency). Extremely compact, dense foams are obtained, which exhibit an outstanding carrying capacity for the excavated material (Table 3, serial no. 17) and thus result in a significant improvement compared with the prior art.

(foam productivity, slump, foam carrying capacity), it is possible to use the cellular ether according to the invention in a technologically simplified manner and to thereby improve the prior art. Since the samples investigated exhibited improved ecotoxicological values, (DOC values) on their own and preferably in combination with surfactants, the use of the products claimed according to the invention is also accompanied by less expensive dumping of the waste material.

Depending on the requirements of the application technology, an increased usage of product (foam addition) may be required, since a change in the geological properties of the soil also makes it necessary for the foam system to be adapted to the local conditions. Surprisingly, however, this is not accompanied by a disproportionate increase in the dissolved, organically bonded carbon which is contained in the eluate from the soil-foam mixture (see Table 4, serial nos. 2 and 5). On the contrary, the use of the new types of cellulose ether in combination with conventional foam-generating systems (surfactants) results in an improvement in foam productivity (foam factor) with the obtainment of ecotoxicological parameters which are almost unchanged compared with untreated soil (Table 4: compare serial nos. 1 and 2 with serial nos. 4 and 6).

TABLE 4

Application technology results and ecological results compared with the prior art

| Serial no. | Cellulose ether/product no.[1] | Foam factor | Foam addition (% by volume) | Slump (mm)[2] | Ball array (no.) in foam[3] | Amount of surfactant (%)[4] | Conductivity ($\mu$S/cm)[7] | DOC (mg/l)[5] | Carbohydrate (mg/l)[6] | Remarks |
|---|---|---|---|---|---|---|---|---|---|---|
| 1 | soil | — | — | — | — | — | 34.9 | 3.4 | 6.9 | control sample |
| 2 | CMC/1 | 5.6 | 10 | 210 | 6 | 2 | 19.3 | 6.1 | 15.4 | prior art |
| 3 | MHECMC/8 | 4.3 | 10 | 150 | 10 | — | 17.5 | 6.5 | 15.4 | invention |
| 4 | MHECMC/8 | 5.3 | 10 | 220 | 6 | 2 | 20.5 | 4.2 | 8.3 | invention |
| 5 | MHESEC/10 | 6.5 | 15 | 145 | 6 | — | 13.5 | 6.9 | 11.8 | invention |
| 6 | MHESEC/10 | 8.0 | 10 | 190 | 5 | 2 | 43.8 | 3.8 | 9.8 | invention |

[1]see Table 1 for characteristic product property data
[2]slump according to DIN ISO 4109 for fresh concrete: desired range 180 ± 50 mm
[3]foam consistency according to DIN 4126 for underground curtain walls made of site-mixed concrete
[4]surfactant OMC 181 ®, Henkel KGaA, Düsseldorf
[5]dissolved, organically-bound carbon contained in the eluate from the soil or from the soil-foam mixture (DIN 38409 H3-1)
[6]carbohydrate in the eluate, determined as methyl-hydroxyethyl cellulose or as CMC (DS = 0.9) (serial no. 2)
[7]conductivity of the eluate according to DIN 38404 C5
[8]conductivity, DOC and carbohydrate from the eluate (centrifuged material; 2800 revolutions/3 minutes). Eluate according to DIN 38414 S4 (about 100 g dry material per 1 liter water; duration 24 hours, 10 rpm).

In principle, the products methyl-hydroxypropyl-carboxymethyl cellulose (MHPCMC) and methyl-hydroxyethyl-sulphoethyl cellulose (MHESEC) which are listed in Table 3 behave similarly. Features which should be emphasised here are the very good productivities (foam factors) (product no. 10 in Table 3) and the values for the slump, which correspond to the prior art. The use of these products again leads to a simplification of the process, since the addition of foam-generating systems (surfactants) can be avoided.

Because the use of further additives as described in the patent literature (see above) is not absolutely necessary when using the cellulose ethers claimed according to the invention, the use of these new types of cellulose ethers is less expensive and technologically simpler. Furthermore, due to the improved application technology parameters which can be achieved when using one-component systems

We claim:

1. In a drilling fluid comprising water and a cellulose ether, the improvement wherein the cellulose ether is a water-soluble ternary ionic cellulose mixed ether selected from the group consisting of methyl-hydroxyethylcarboxymethyl cellulose; methyl-hydroxyethyl-dicarboxymethyl cellulose; methyl-hydroxyethyl-sulphoethyl cellulose; and methyl-hydroxypropyl-carboxymethyl cellulose.

2. The drilling fluid according to claim 1 which further comprises a surfactant.

3. The drilling fluid according to claim 2 wherein said ethers have an average degree of substitution of alkyl substituents of about DS 0.5 to about DS 2.8 and of ionic components of about DS 0.0001 to about DS 1.5 and wherein the average molar degree of substitution by hydroxyalkyl substituents is about 0.001 to about 2.5.

4. In the drilling into earth with removal of earth to form a substantially earth-free hole, wherein during drilling there is added a drilling fluid comprising water and a cellulose ether, the improvement wherein the cellulose ether is a water-soluble ternary ionic cellulose mixed ether selected from the group consisting of methyl-hydroxy-ethyl-carboxymethyl cellulose; methyl-hydroxyethyl-dicarboxymethyl cellulose; methyl-hydroxyethyl-sulphoethyl cellulose; and methyl-hydroxypropyl-carboxymethyl cellulose.

5. The method according to claim 4 which further comprises a surfactant.

6. The method according to claim 5 wherein said ethers have an average degree of substitution of alkyl substituents of about DS 0.5 to about DS 2.8 and of ionic components of about DS 0.0001 to about DS 1.5 and wherein the average molar degree of substitution by hydroxyalkyl substituents is about 0.001 to about 2.5.

7. The method according to claim 1 wherein said ethers have an average degree of substitution of alkyl substituents of about DS 0.5 to about DS 2.8 and of ionic components of about DS 0.0001 to about DS 1.5 and wherein the average molar degree of substitution by hydroxyalkyl substituents is about 0.001 to about 2.5.

8. The method according to claim 1 wherein the drilling is effected by shield advance technique.

9. The method according to claim 1 wherein the drilling is effected by earth pressure shield technique.

* * * * *